United States Patent [19]

Moore et al.

[11] Patent Number: 5,237,751

[45] Date of Patent: Aug. 24, 1993

[54] TIPPING APPARATUS FOR LIVESTOCK AND OTHER HORNED ANIMALS

[76] Inventors: Wayland F. Moore, Box 665; Glynard Moore, Box 586, both of, Matador, Tex. 79224

[21] Appl. No.: 620

[22] Filed: Jan. 5, 1993

[51] Int. Cl.⁵ .................. B26B 19/00; B26B 17/00; B26B 13/00
[52] U.S. Cl. .................................. 30/200; 30/134; 30/258
[58] Field of Search ............... 30/134, 155, 200, 254, 30/257, 258, 260, 349

[56] References Cited

U.S. PATENT DOCUMENTS

| | | | |
|---|---|---|---|
| 406,208 | 7/1889 | Fugate | 30/243 |
| 438,959 | 10/1890 | Steele | 30/243 |
| 441,065 | 11/1890 | Green | 30/244 |
| 447,611 | 3/1891 | Ingraham | 30/244 |
| 448,092 | 3/1891 | Stout | 30/243 |
| 451,049 | 4/1891 | Hindman | 30/258 |
| 458,537 | 8/1891 | Newton | 30/258 |
| 472,139 | 4/1892 | Newton | 30/243 |
| 480,246 | 8/1892 | Brosius | 30/243 |
| 480,932 | 8/1892 | Mills | 30/243 |
| 534,112 | 2/1895 | Leavitt | 30/243 |
| 753,048 | 2/1904 | Des Moineaux | 30/233 |
| 814,100 | 3/1906 | Webster | 30/243 |
| 830,470 | 9/1906 | Webster | 30/244 |
| 1,104,768 | 7/1914 | Bernard | 30/258 |
| 1,359,315 | 11/1920 | Barufke | 30/254 |
| 1,994,864 | 3/1935 | Nisbet | 30/244 |
| 2,292,204 | 8/1942 | Cross | 30/258 |
| 2,615,516 | 4/1949 | Hyde | 30/134 |
| 2,643,454 | 6/1953 | Kuhnsham | 30/253 |
| 2,820,292 | 1/1958 | Bouten et al. | 30/182 |
| 3,277,573 | 10/1966 | Nicoletta | 30/254 |
| 4,050,152 | 9/1977 | Olson | 30/90.1 |
| 4,271,593 | 6/1981 | Smith | 30/233 |
| 5,005,291 | 4/1991 | Moore et al. | 30/244 |

Primary Examiner—Douglas D. Watts
Assistant Examiner—Paul M. Heyrana, Sr.
Attorney, Agent, or Firm—Konneker, Bush & Hitt

[57] ABSTRACT

Apparatus for tipping a horn of a horned animal by removing a selected portion thereof. A positioning member having an aperture which extends between first and second side surfaces thereof is pivotally mounted to a cutting member having a cutting edge formed along a first side surface thereof. The aperture is defined by an inner side surface of the positioning member which includes a first, inwardly tapered, portion and a second, untapered, portion. When the positioning member is placed over the horn, first and second edge surfaces which define first and second boundaries of the inwardly tapered portion circumferentially bite into the horn at first and second locations, respectively. The cutting member is then pivoted towards the positioning member to sever the selected portion of the horn. The cutting member is comprised of a support member having a cut-away portion and a blade member flush mounted in the cut-away portion of the support member. A first portion of a side surface of the blade member is bevelled to provide a first surface for separating severed and unsevered portions of the horn and to form the cutting edge for the cutting member. The support member is flare-notched to expose various lengths of the bevelled and unbevelled portions of the blade member and an edge side surface of the support member which defines the notch is also bevelled to provide a second surface for further separating the severed and unsevered portions of the horn.

9 Claims, 1 Drawing Sheet

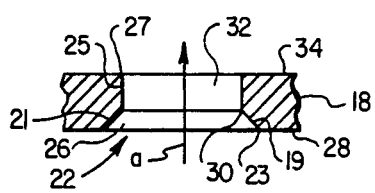
FIG. 4
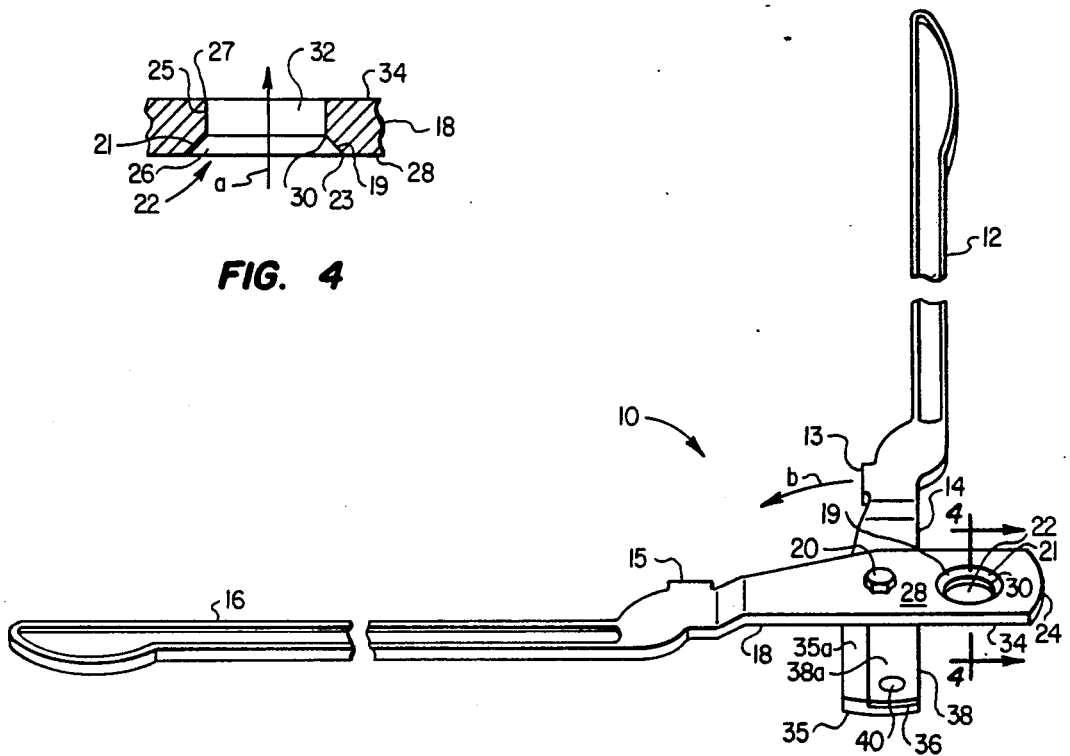
FIG. 1
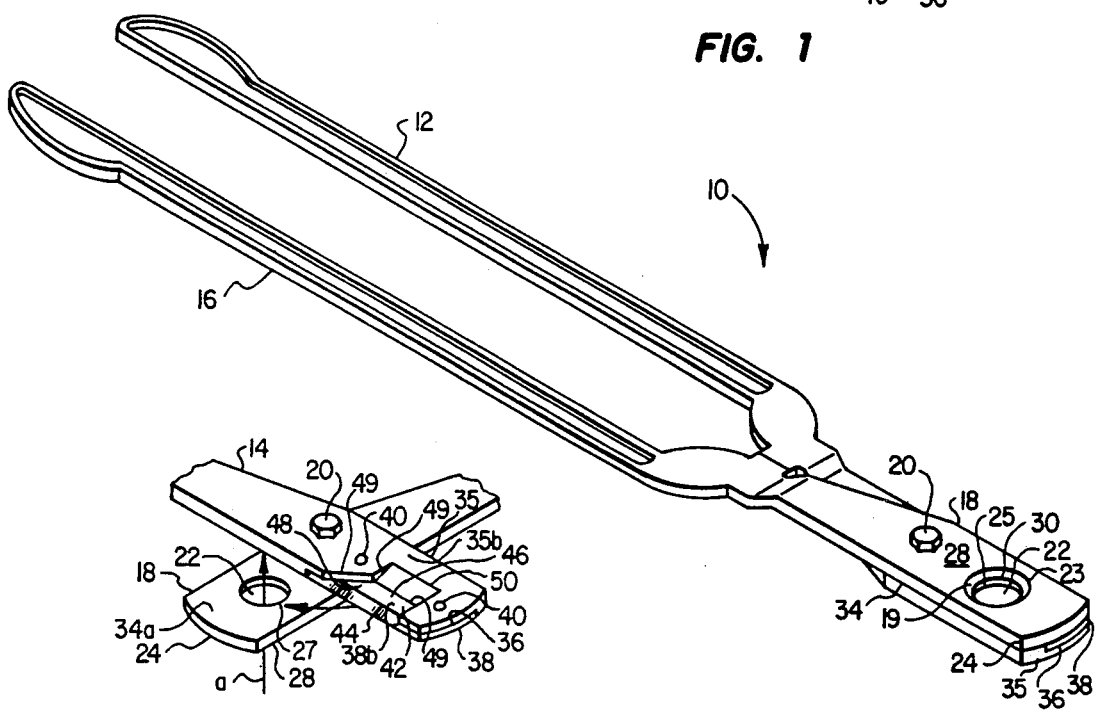
FIG. 3
FIG. 2

TIPPING APPARATUS FOR LIVESTOCK AND OTHER HORNED ANIMALS

BACKGROUND OF THE INVENTION

1. Field of the Invention

This invention is related to apparatus for managing livestock and other horned animals and, more particularly, to a horn tipper for removing a selected portion of a horn of a horned animal.

2. Description of Related Art

Certain mammals such as cattle, sheep, goats and antelope have hard protuberances extending from the frontal bone of their skulls. These hard protuberances, generally referred to as horns, consist of a bony core covered with a sheath of keratinous material. Depending on the particular breed, horns are used for varied purposes including defense of self and offspring, domination of others and clearing heavy undergrowth, as well as many other purposes too numerous to discuss herein.

Many horned animals such as cattle and sheep are utilized for the production of foodstuffs such as meat and diary products. To maximize foodstuff production, such animals are often kept in close quarters with other foodstuff producing animals. When animals are kept in such close quarters, the horn becomes inconsistent with the safe and efficient management of such horned animals for the aforementioned foodstuff production. Dehorning, which is defined as the literal removal of the horns from cattle or other horned livestock, is intended to reduce the possibility of injury to both the horned animals being kept as well as any stockmen or herdsmen managing such animals. When kept in close quarters, any horned animal can severely cut or bruise other animals in the herd. Such injuries often reduce the value of the carcass for meat producing animals and reduce the rate of milk production for dairy producing animals. Furthermore, horned animals require more shed and feeding space, thereby reducing the efficiency of such operations. Finally, horned animals are harder and more dangerous to handle during routine management practices such as veterinary care.

There are numerous methods and devices which may be utilized to dehorn livestock. One method of dehorning, generally referred to as Barnes-type dehorning uses dehorners having a pair of pivoting cutting blades controlled by attached handles. Barnes-type dehorners of various designs may be seen by reference to U.S. Pat. Nos. 441,065 to Green, 830,470 to Webster, 1,994,864 to Nisbet, 2,643,454 to Kuhns and 5,005,291 to Moore et al. Another type of popular dehorning device is the dehorning clipper. Typically, dehorning clippers includes a blade member having a toothed shaft extending from one end thereof. Dehorner clippers also include one, or more commonly, a pair of handles having respective toothed sections for interacting with the toothed shaft to force the blade member upward, thereby closing an aperture to sever the horn. Clipper type dehorners of various designs may be seen by reference to U.S. Pat. Nos. 406,208 to Fugate, 438,959 to Steele, 448,092 to Stout, 472,139 to Newton, 480,146 to Brosius, 480,932 to Mills, 534,112 to Leavitt and 814,100 to Webster.

Despite the many advantages associated therewith, the dehorning of animals is not always a feasible technique for managing livestock. It is generally recognized that dehorning traumatizes the animal. For example, dehorning will often expose the sinus cavity within the head of the animal and/or cause a significant amount of bleeding. As a result, it is generally recommended that dehorning be performed as early as possible in an animal's life. Barnes-type dehorners are generally recommened for dehorning cattle between 4 and 12 months of age while dehorning clippers are viewed as the most efficient instrument for dehorning cattle between 1 and 2 years old. For older animals, dehorning is often not recommended. Seasonal considerations may also limit the availability of dehorning as a management technique. In general, dehorning is not recommended during fly season, extremely cold weather or hot weather. The open sinuses often produced during the dehorning process can lead to respiratory complications during extremely cold weather. The exposed sinus cavity and blood that often appear after dehorning also provide an ideal medium for parasite infestation, particularly during hot weather. Thus, the ideal times of the year for dehorning cattle and other livestock is in the spring before flies appear and in the fall, after flies disappear. Accordingly, it may often occur that when the animal is ready to be dehorned, it is the improper period of the year to perform the dehorning.

For these and other reasons, horn tipping, where only the tip or pointed end of the horn is removed, is often a desirable alternative to dehorning and is particularly well suited as a management technique for animals considered too old to be dehorned using the aforementioned techniques. By shortening the horn, horn tipping, like dehorning, will reduce the likelihood of injury in close quarters and the other ill effects which may result by leaving animals horned. However, as much less of the horn is removed during the tipping process, the animal will be significantly less traumatized by the process. While a number of the above-identified dehorners could conceivably be used as tippers by positioning the cutting member partway along the length of the horn so that only a portion of the horn is severed using the dehorners, such an attempt to tip horns using a dehorner could easily result in the removal of too much horn, thereby producing the very effects that tipping was intended to avoid.

It is an object of this invention, therefore, to provide an apparatus for tipping a horn of a horned animal in which a selected portion of the horn may be severed without risk of the accidental removal of an excess amount of the horn.

SUMMARY OF THE INVENTION

The present invention is of an apparatus for tipping a horn of a horned animal such that only a selected portion of the horn is removed during the tipping process. The tippers is comprised of a positioning member having an aperture which extends between first and second side surfaces of the positioning member, a cutting member having a cutting edge formed along a first side surface thereof and means for pivotally mounting the cutting member to the positioning member. The positioning member further includes limiting means such that, when a horn to be tipped is positioned in the aperture, only the selected portion of the horn will project from the first side surface of the positioning member where it is severed from the horn when the cutting member is pivoted towards the positioning member. In one aspect of the invention, an aperture defining, inwardly tapered, interior side surface of the positioning member provides the aforementioned limiting means which, in a second aspect of the invention, further includes first and second edge surfaces for circumferentially biting into the horn at first and second locations, respectively. The first edge surface may be located along the second side surface of the cutting member and the second edge surface may be located at a boundary between the tapered portion and a non-tapered portion of the interior side surface of the positioning member.

In another aspect of the invention, the cutting member may be further comprised of a support member having a cut-away portion and a blade member mounted in the cut-away portion of the support member such that first side surfaces of the blade and support member lie flush with each other. A first portion of a second side surface of the blade member is bevelled to provide a first surface for separating severed and unsevered portions of the horn and to form the cutting edge for the cutting member. The support member may have a notch, either flared or unflared, formed therein to expose various lengths of the bevelled and unbevelled portions of the blade member used to tip the horn. Finally, in yet another aspect of the invention, a portion of an edge side surface of the support member which defines the notch may also be bevelled to provide a second surface for further separating the severed and unsevered portions of the horn when the cutting member is pivoted towards the positioning member.

BRIEF DESCRIPTION OF THE DRAWING

The present invention may be better understood, and its numerous objects, features and advantages will become apparent to those skilled in the art by reference to the accompanying drawing in which:

FIG. 1 is a rear side perspective view of a tipping apparatus for livestock and other horned animals constructed in accordance with the teachings of the present invention and in its open position, with handles portions of the tipping apparatus being longitudinally foreshortened for illustrative purposes;

FIG. 2 is a rear side perspective view of the tipping apparatus of FIG. 1 in its closed position;

FIG. 3 is a fragmentary front perspective view of a cutting end portion of the tipping apparatus of FIGS. 1-2; and FIG. 4 is an enlarged scale, inverted cross-sectional view through a positioning member portion of the tipping apparatus of FIGS. 1-3 taken along line 4-4 of FIG. 1.

DETAILED DESCRIPTION OF A PREFERRED EMBODIMENT

Referring first to FIG. 1, a tipping apparatus 10 for removing a selected portion of a horn of a horned animal and constructed in accordance with the teachings of the present invention may now be seen. The tipping apparatus 10 includes a first handle 12 having a cutting member 14 integrally formed therewith and a second handle 16 having a positioning member 18 integrally formed therewith. Conventional pivotal securing means such as bolt 20 secures the cutting member 14 to the positioning member 18 such that, by moving the handles 12, 16, towards each other, for example, by moving the handle 12 in direction "b", the tipping apparatus 10 may be moved from an open position illustrated in FIG. 1 where handle projections 13, 15 are spaced apart from each other to a closed position illustrated in FIG. 2 where the projections 13, 15 contact each other to stop the travel of the handles 12, 16 with respect to each other.

Referring next, in combination, to FIGS. 1 and 4, the positioning member 18 will now be described in greater detail. The positioning member 18 includes an aperture 22 which extends through the positioning member 18 near a front edge 24 thereof and which is defined by an interior side surface 19 of the positioning member 18. The aperture 22 is comprised of a first, generally frustoconical section 26 defined by a first, tapered portion 21 of the interior side surface 19 which inwardly tapers from an edge surface 23 of the lower side surface 28 to an interior edge surface 30 and a second, generally conical section 32 defined by a second, non-tapered portion 25 of the interior side surface 19 which extends from the interior edge surface 30 of the interior side surface 19 to an edge surface 27 of the front side surface 34 of the positioning member 18.

Referring next, in combination, to FIGS. 1 and 3, the cutting member 14 will now be described in greater detail. The cutting member 14 includes a support section 35 having a generally L-shaped cutaway portion 36 which extends along approximately two-thirds of the width and approximately one-eighth of the thickness of the cutting member 14. Blade member 38 is fixedly mounted in the cutaway portion 36 such that side surface 38a of the blade member 38 lies flush with side surface 35a of the support section 35. For example, a pair of rivets 40 may be used to fixedly secure the blade member 38 to the support section 35. Alternately, a pair of screws (not shown) may be used so that the blade member 38 may be more easily removed from the support section 34 for sharpening and/or replacement thereof.

As may be best seen in FIG. 3, the support section 35 of the cutting member 14 further includes a notch 42 defined by an edge surface 49 and exposing a portion of the blade member 38. A side surface 44 of the blade member 38 is bevelled to provide a sharp cutting edge for the cutting member 14. Preferably, the bevelled side surface 44 should be positioned such that, when the tipping apparatus 10 is moved from the open position illustrated in FIG. 1 to the closed position illustrated in FIG. 2, the bevelled side surface 44 will pass over, in close proximity to the side surface 35a of the support section 35, the entire aperture 22. To further facilitate the quick removal of that portion of a horn to be severed using the tipping apparatus 10, the notch 42 should be configured such that the portion of the bevelled side surface 44 passing over the aperture 22 is positioned adjacent to and exposed by the notch 42. To do so, the notch 42 defined by the edge surface 49 includes a generally rectangular portion 46 and a flared portion 48. Thus, when the cutting member 14 is pivoted towards the positioning member 18 by pivoting handle 12 in direction b, a first portion of the bevelled side surface 44 which is exposed by the flared portion 48 of the notch 42 will be presented to the horn to begin the severing process. As the cutting member 14 continues to pivot towards the positioning member 18, a second portion of the bevelled side surface 44 which is exposed by the generally rectangular portion 46 of the notch 42 will be presented to the horn to continue the severing process and, as the pivoting continues, begin to separate the severed portion of the horn from the unsevered portion. As may be further seen in FIG. 3, the support section 35 further includes a bevelled section 50 which extends downwardly from a second side surface 35b of the support section 35 to a portion of the edge surface 49 which defines the periphery of the generally rectangular portion 46 of the notch 42. The bevelled section 50 further assists in the separation of the portion of the horn to be removed using the tipping apparatus 10 from the remainder of the horn.

Referring now, in combination, to FIGS. 1-4, the operation of the tipping apparatus 10 will now be described in detail. In general, horns tend to have their greatest diameter at the base and gradually taper to a point as they extend away from the head. Prior to commencing the tipping procedure to sever a portion of a horn, a tipping apparatus 10 having an aperture 22 sized such that the portion of the horn to be removed will project from the aperture of that tipping apparatus 10, is selected. For example, it is contemplated that a stockman will have multiple tippers, each designed to tip a different horn length, to select from before commencing the tipping procedure. Typical sizes available will be the "nickel" and "quarter" size tipping apparatuses 10, each of which will have an positioning member approximately three-eighths of an inch thick, an interior edge surface 30 located between one-sixteenth and one-eighth of an inch from the lower side surface 28, and edge surfaces 27, 30 each having a diameter approximately equal to that of a nickel and quarter, respectively. Each tipping apparatus will further include an edge surface 23 having a diameter slightly greater, for example, one-eighth of an inch greater, than the edge surfaces 27, 30. The stockman selects the correct sized tipper by evaluating the proper amount of horn which should be removed, estimating the diameter of the horn at the proposed cutting location and selecting a tipping apparatus having an edge surface 27 which defines an aperture having a matching diameter.

Once a tipping apparatus 10 having an appropriately sized aperture has been selected, the stockman commences removal of the desired length of a horn by pulling the handles 16, 12 apart so that the positioning and cutting members 18, 14 are in the open position illustrated in FIGS. 1 and 3. The positioning member 18 is then placed over the horn such that the horn passes through the aperture 22 in direction "a" until the edge surfaces 27, 30 which define the generally frusto-conical section 26 of the aperture 22 bite into the horn, thereby enabling the tapered portion 21 of the interior side surface 10 to firmly grasp the horn in place. Once the horn is grasped in place, the handle 12 is pivoted in direction "b" so that the bevelled side surface 44 of the blade member 38 severs the portion of the horn projecting beyond the side surface 34. As previously described, as the cutting member 18 is pivoted towards the positioning member 14, the bevelled side surface 44 of the blade member 38 pivots toward the portion of the horn projecting beyond the side surface 34 such that portion of the bevelled side surface 44 exposed by the flared portion 48 of the notch 42 cuts into the horn first and, as the cutting member 18 continues to pivot, the portion of the bevelled side surface 44 exposed by the rectangular portion 46 of notch 44 continues to cut into the horn. As the cutting member 18 continues to pivot, the bevelled portion 44 of the blade member will begin to separate the severed and unsevered portions of the horn and the two will be further separated by the bevelled portion 50 of the cutting member 18 until the severed or "tipped" portion of the horn is fully separated from the remainder of the horn.

Thus, there has been described and illustrated herein, an apparatus for tipping horns of livestock and other horned animals which prevents the inadvertent removal of an excessive length of horn by providing a positioning member which engages the horn partway along the length thereof before the selected length of horn is severed thereby. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as limitation of the scope of the invention.

What is claimed is:

1. An apparatus for tipping a horn of a horned animal, comprising:

a positioning member having first and second side surfaces and an aperture extending between said first and second side surfaces for receiving a horn to be tipped, said aperture being defined by a first, generally circular, edge surface formed along said first side surface, an interior side surface extending from said first edge surface to said second side surface and a second, generally circular, edge surface formed along said interior side surface, said second edge surface being parallel with and spaced apart a constant distance from said first edge surface, said interior side surface being inwardly tapered between said first edge surface and said second edge surface, said first edge surface, said inwardly tapered portion of said interior side surface and said second edge surface forming limiting means for engaging said horn such that said first and second edge surfaces circumferentially bite into said horn at first and second locations, respectively, and only a selected portion of said horn projects from said first side surface of said positioning member;

a cutting member having first and second side surfaces and a cutting edge formed along said first side surface;

means for pivotally mounting said cutting member to said positioning member such that said cutting edge of said cutting member slides across said first side surface of said positioning member when said cutting member is pivoted towards said positioning member;

wherein said selected portion of said horn projecting from said first side surface of said positioning member is severed by said cutting edge when said cutting member is pivoted towards said positioning member.

2. An apparatus for tipping a horn of a horned animal according to claim 1 wherein said aperture terminates at a third, generally circular, edge surface formed along said second side surface, said third edge surface being parallel with and spaced apart from said second edge surface, said inner side surface being non-tapered between said second and third edge surfaces.

3. An apparatus for tipping a horn of a horned animal comprising:

a positioning member having first and second side surfaces and an aperture extending between said first and second side surfaces for receiving a horn to be tipped, said positioning member having limiting means for engaging said horn such that only a selected portion of said horn projects from said first side surface of said positioning member;

a blade member having first and second side surfaces; and a support member having first and second sides surfaces, a portion of said support member being cutaway to receive said blade member such that said first side surface of said blade and support members are flush with each other;

a first portion of said blade member being bevelled to form a cutting edge of said support member and a second portion of said blade member being unbevelled;

a notch being formed in said support member to expose at least part of said bevelled portion of said blade member, said exposed bevelled portion of said blade member providing a first surface for separating severed and unsevered portions of said horn when said support member is pivoted towards said positioning member; and means for pivotally mounting said support member to said positioning member such that said cutting edge of said support member slides across said first side surface of said positioning member when said support member is pivoted towards said positioning member, thereby severing said selected portion of said horn projecting from said first side surface of said positioning member.

4. An apparatus for tipping a horn of a horned animal according to claim 3 wherein said notch is flared along one side thereof to expose a length of said first, bevelled, portion of said blade member greater than the exposed length of said second, unbevelled, portion of said blade member.

5. An apparatus for tipping a horn of a horned animal according to claim 4 wherein a portion of an edge side surface of said support member which defines said notch is bevelled, said bevelled portion of said support member providing a second surface for further separating severed and unsevered portions of said horn when said cutting member is pivoted towards said positioning member.

6. An apparatus for tipping a horn of a horned animal according to claim 3 wherein said aperture is defined by an interior side surface of said positioning member and wherein said limiting means further comprises an inwardly tapered portion of said interior side surface.

7. An apparatus for tipping a horn of a horned animal according to claim 6 wherein said limiting means further comprises first and second edge surfaces for circumferentially biting into said horn at first and second locations, respectively.

8. An apparatus for tipping a horn of a horned animal according to claim 7 wherein said first edge surface is located along said second side surface of said support member, said first edge surface defining an outer peripheral edge of said first portion of said interior side surface.

9. An apparatus for tipping a horn of a horned animal, comprising:

a positioning member having first and second side surfaces and an aperture extending between said first and second side surfaces for receiving a horn to be tipped, said aperture being defined by a first, generally circular, edge surface formed along said first side surface, an interior side surface extending from said first edge surface to said second side surface and a second, generally circular, edge surface formed along said interior side surface, said second edge surface being generally parallel with and spaced apart a constant distance from said first edge surface, said interior side surface being inwardly tapered between said first edge surface and said second edge surface, said first edge surface, said inwardly tapered portion of said interior side surface and said second edge surface forming limiting means for engaging said horn such that said first and second edge surfaces circumferentially bite into said horn at first and second locations, respectively, and only a selected portion of said horn projects from said first side surface of said positioning member;

a blade member having first and second side surfaces;

a support member having first and second sides surfaces, a portion of said support member being cutaway to receive said blade member such that said first side surfaces of said blade and support members are flush with each other;

a first portion of said blade member being bevelled to form a cutting edge for said support member and a second portion of said blade member being unbevelled;

a notch being formed in said support member to expose at least part of said bevelled portion of said blade member, said exposed bevelled portion of said blade member providing a first surface for separating severed and unsevered portions of said horn when said support member is pivoted towards said positioning member; and means for pivotally mounting said support member to said positioning member such that said cutting edge of said support member slides across said first side surface of said positioning member when said support member is pivoted towards said positioning member, thereby severing said selected portion of said horn projecting from said first side surface of said positioning member.

* * * * *

UNITED STATES PATENT AND TRADEMARK OFFICE
CERTIFICATE OF CORRECTION

PATENT NO. : 5,237,751
DATED : August 24, 1993
INVENTOR(S) : Wayland F. Moore, et al.

It is certified that error appears in the above-indentified patent and that said Letters Patent is hereby corrected as shown below:

Column 1, line 24, "diary" should be --dairy--.

Signed and Sealed this

Nineteenth Day of April, 1994

Attest:

BRUCE LEHMAN

*Attesting Officer*  *Commissioner of Patents and Trademarks*